(12) United States Patent
Gross et al.

(10) Patent No.: US 7,523,200 B2
(45) Date of Patent: Apr. 21, 2009

(54) DYNAMIC ACCESS DECISION INFORMATION MODULE

(75) Inventors: Thomas Gross, Zurich (CH); Brook M. Lovatt, Santa Cruz, CA (US); Anthony Scott Moran, Santa Cruz, CA (US); Matthias Schunter, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 980 days.

(21) Appl. No.: 10/612,703

(22) Filed: Jul. 2, 2003

(65) Prior Publication Data

US 2005/0004913 A1 Jan. 6, 2005

(51) Int. Cl.
*G06F 15/173* (2006.01)
*G06F 7/00* (2006.01)
*G06F 17/00* (2006.01)

(52) U.S. Cl. .................. 709/225; 709/223; 709/224; 709/226; 726/1; 726/2; 726/3; 707/3; 707/4; 707/5

(58) Field of Classification Search ......... 709/223–226, 709/202, 217–219; 707/3–6; 726/1–5, 12, 726/17–19
See application file for complete search history.

(56) References Cited

U.S. PATENT DOCUMENTS

| 5,375,241 | A | | 12/1994 | Walsh | 395/700 |
|---|---|---|---|---|---|
| 5,838,970 | A | | 11/1998 | Thomas | 395/683 |
| 5,941,947 | A | * | 8/1999 | Brown et al. | 709/225 |
| 6,052,785 | A | * | 4/2000 | Lin et al. | 726/5 |
| 6,067,623 | A | * | 5/2000 | Blakley et al. | 726/5 |
| 6,081,906 | A | * | 6/2000 | Nishizawa et al. | 714/2 |
| 6,092,099 | A | * | 7/2000 | Irie et al. | 709/202 |
| 6,105,067 | A | * | 8/2000 | Batra | 709/227 |

(Continued)

FOREIGN PATENT DOCUMENTS

WO WO 98/21668 5/1998

OTHER PUBLICATIONS

Qian et al., "Digital-Item-Based Media Management System and Applications", Proceedings 2002 IEEE International Conference on Multimedia and Expo (Cat. No. 02TH8604), Part vol. 1, p. 757-760, Abstract.

(Continued)

*Primary Examiner*—Salad Abdullahi
*Assistant Examiner*—Brendan Y Higa
(74) *Attorney, Agent, or Firm*—Yee & Associates, P.C.; Jeffrey S. LaBaw

(57) ABSTRACT

A dynamic information retrieval service is provided that can be configured to retrieve entitlement information from a plurality of providers. Any application that requires entitlement data may make a request for that information to the dynamic information retrieval service using a single standard interface. A request includes information describing the identity of the user and a list of names representing the entitlement data that are required. The dynamic information retrieval service determines the appropriate provider for the entitlement information, retrieves the entitlement data, and returns the requested entitlement data to the application. The dynamic information retrieval service may also cache the entitlement data. The dynamic information retrieval service may process requests requiring several distinct items of entitlement data to be retrieved in parallel. Therefore, applications may send a single request for entitlement data for a single user, but for several providers.

4 Claims, 6 Drawing Sheets

U.S. PATENT DOCUMENTS

| | | | |
|---|---|---|---|
| 6,170,017 B1 * | 1/2001 | Dias et al. | 709/235 |
| 6,205,482 B1 * | 3/2001 | Navarre et al. | 709/227 |
| 6,208,975 B1 | 3/2001 | Bull et al. | 705/14 |
| 6,260,041 B1 * | 7/2001 | Gonzalez et al. | 707/10 |
| 6,263,446 B1 * | 7/2001 | Kausik et al. | 726/5 |
| 6,389,129 B1 | 5/2002 | Cowan | 379/221.03 |
| 6,421,943 B1 * | 7/2002 | Caulfield et al. | 42/70.11 |
| 6,430,562 B1 | 8/2002 | Kardos et al. | 707/10 |
| 6,928,526 B1 * | 8/2005 | Zhu et al. | 711/154 |
| 2002/0023158 A1 | 2/2002 | Pollzzi et al. | 709/227 |
| 2002/0091533 A1 | 7/2002 | Ims et al. | 705/1 |
| 2002/0116646 A1 * | 8/2002 | Mont et al. | 713/201 |
| 2002/0120632 A1 | 8/2002 | Gremmert et al. | 707/104.1 |
| 2002/0120714 A1 * | 8/2002 | Agapiev | 709/218 |
| 2002/0133537 A1 * | 9/2002 | Lau et al. | 709/203 |
| 2002/0156929 A1 | 10/2002 | Hekmatpour | 709/310 |
| 2003/0023607 A1 | 1/2003 | Phelan et al. | 707/100 |
| 2003/0033179 A1 | 2/2003 | Katz et al. | 705/7 |
| 2004/0044770 A1 * | 3/2004 | Messick et al. | 709/226 |
| 2004/0059590 A1 * | 3/2004 | Mercredi et al. | 705/1 |
| 2004/0156392 A1 * | 8/2004 | Walls et al. | 370/469 |
| 2005/0154913 A1 * | 7/2005 | Barriga et al. | 713/201 |

OTHER PUBLICATIONS

Mangisengi et al., "A Framework for Supporting Interoperability of Data Warehouse Islands Using XML", Data Warehousing and Knowledge Discovery, Third International Conference, DaWak 2001, (Lecture Notes in Computer Science vol. 2114), p. 328-38, Abstract.

Brunelle, "Platform and Media-Independence in the Electronic Research Environment", Online Information 95, 19th International Online Information Meeting Proceedings, p. 209-17, Abstract.

* cited by examiner

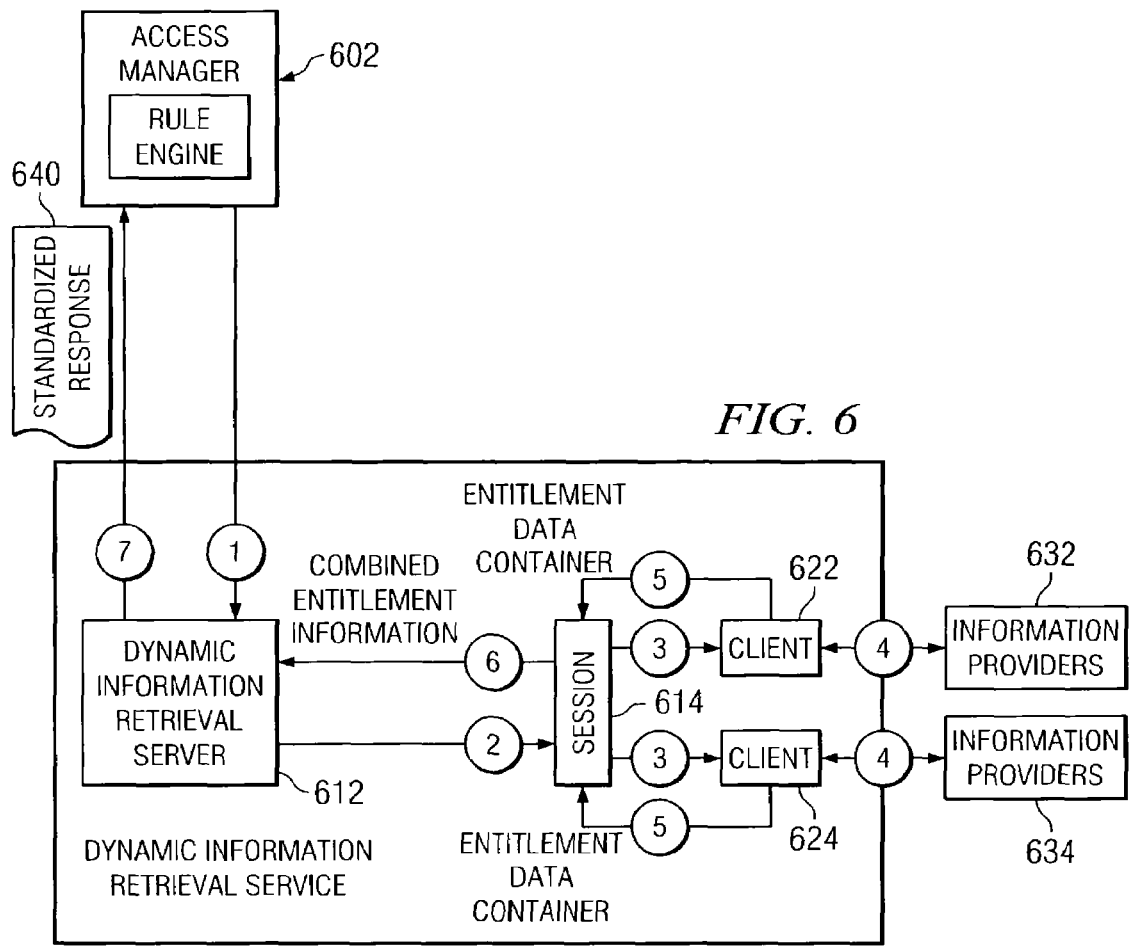

FIG. 6

```
<containerName>
        <attributeName1>data1</attributeName1>
        <attributeName2>data2</attributeName2>
        ...
        <attributeNameN>dataN</attributeNameN>
        <subContainerName1>
                <attributeName>data</attributeName>
                ...
        </subContainerName1>
        <subContainerName2>
                ...sub-container data...
        </subContainerName2>
        ...
        <subContainerNameN>
                ...sub-container data...
        </subContainerNameN>
</containerName>
```

FIG. 7

DYNAMIC ACCESS DECISION INFORMATION MODULE

BACKGROUND OF THE INVENTION

1. Technical Field

The present invention relates to data processing system and, in particular, to a method, apparatus, and program for providing access decision information.

2. Description of Related Art

The Internet is a network of networks, made up of computers in many countries covering commercial, academic and government endeavors. Originally developed for the U.S. military, the Internet became widely used for academic and commercial research. Users had access to unpublished data and journals on a large variety of subjects. However, today the Internet has become commercialized into a worldwide information superhighway, providing information on every subject known to humankind.

A client/server architecture is an architecture in which the user's computer, the client, is the requesting machine and the server is the supplying machine. The client and server are both connected via a local area network (LAN) or a wide area network (WAN), such as the Internet. In client/server environment, the client processes the user interface and can perform some or all of the application processing. Servers range in capacity from high-end personal computers to mainframes.

An example of a client/server environment is the World Wide Web (WWW), which is an Internet service that links documents locally and remotely. Documents are stored on the Internet in "Web servers" that store and disseminate Web pages in hypertext markup language (HTML) to Web browsers at the clients. The Web page, or Web document, contains text, graphics, animations and videos as well as hypertext links. Hypertext links in a Web page let users jump from page to page, whether the pages are stored on the same server or on servers around the world. The Web has also turned into an online shopping mall as almost every organization has added electronic commerce (e-commerce) capabilities.

In many cases, a computer, such as a Web server with e-commerce capabilities, must make informed user specific decisions based on entitlement data. For example, a Web site may perform age verification using driver's license information before selling an R-rated movie. This entitlement data may be stored in distributed heterogeneous information systems.

Currently, the only way for this entitlement data to be leveraged is through proprietary and/or disparate programming interfaces. A disadvantage of this approach is that in order for each application in the system to have access to the required attributes, each application must perform its own discovery of the entitlement data. This is especially inefficient for the case where multiple operations may be performed by different applications on the same piece of data. Furthermore, this requires a large amount of custom development on the part of the application developer, because each application must include an interface for each entitlement information provider.

Therefore, it would be advantageous to provide a single solution for retrieving and handling user specific attribute information from various providers.

SUMMARY OF THE INVENTION

The present invention provides a dynamic information retrieval service that can be configured to retrieve entitlement information from a plurality of providers. Any application that requires entitlement data may make a request for that information to the dynamic information retrieval service using a single standard interface. A request includes information describing the identity of the user and a list of names representing the entitlement data that are required. The dynamic information retrieval service determines the appropriate provider for the entitlement information, retrieves the entitlement data, and returns the requested entitlement data to the application. The dynamic information retrieval service may also cache the entitlement data. The dynamic information retrieval service may process requests requiring several distinct items of entitlement data to be retrieved in parallel. Therefore, applications may send a single request for entitlement data for a single user, but for several providers.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is a data flow diagram for a dynamic information retrieval service in accordance with a preferred embodiment of the present invention;

FIG. 7 illustrates an example container data structure in accordance with a preferred embodiment of the present invention.

DETAILED DESCRIPTION OF THE PREFERRED EMBODIMENT

Figure 1:
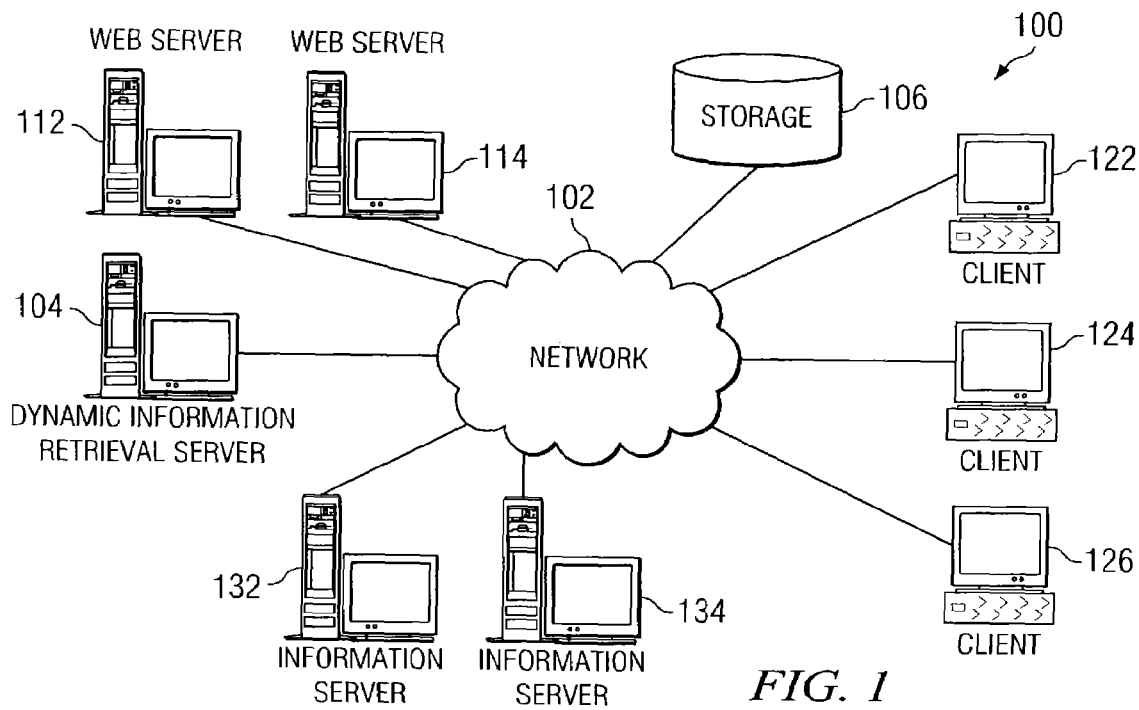
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, servers 104, 112, 114, 132, 134 are connected to network 102 along with storage unit 106. In addition, clients 122, 124, 126 are connected to network 102. These clients 122, 124, 126 may be, for example, personal computers or network computers. In the depicted example, servers 112, 114 may be Web servers that provide data to clients 122, 124, 126. Clients 122, 124, 126 are clients to servers 112, 114. Network data processing system 100 may include additional servers, clients, and other devices not shown.

Web servers 112, 114 may make access decisions based on entitlement data. As used herein, entitlement data or information refers to any attribute for an entity, such as a user, that may be used to make access decisions. Entitlement data is also referred to as access decision information. For example, Web server 112 may allow a purchase based on available credit and Web server 114 may validate an on-line test taker based on a social security number and drivers license information. Thus, Web servers 112, 114 may retrieve information from information servers 132, 134. Available credit, social security number, and driver's license information are examples of entitlement data.

Most likely, information servers 132, 134 have proprietary and/or disparate programming interfaces. In order for each Web server to have access to the required entitlement data, Web server must perform its own discovery of the entitlement data. This is especially inefficient for the case where multiple operations may be performed by different applications on the same piece of data. Furthermore, this requires a large amount of custom development on the part of the application developer, because each application must include an interface for each entitlement information provider.

In accordance with a preferred embodiment of the present invention, a dynamic information retrieval service is configured to retrieve entitlement information from a plurality of providers, such as information servers 132, 134. The dynamic information retrieval service may be embodied as software within web servers 112, 114. In an alternative embodiment, the dynamic information retrieval service is employed within dynamic information retrieval server 104. Web servers 112, 114 may then request entitlement data through network 102.

Any application that requires entitlement data may make a request for that information to the dynamic information retrieval service using a single standard interface. A request may include information describing the identity of the user and a list of names representing, the entitlement data that are required. The dynamic information retrieval service determines the appropriate provider for the entitlement information, retrieves the entitlement data, and returns the requested entitlement data to the application. The dynamic information retrieval service may also cache the entitlement data. The dynamic information retrieval service may process requests requiring several distinct items of entitlement data to be retrieved in parallel. Therefore, applications may send a single request for entitlement data for a single user, but for several providers.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
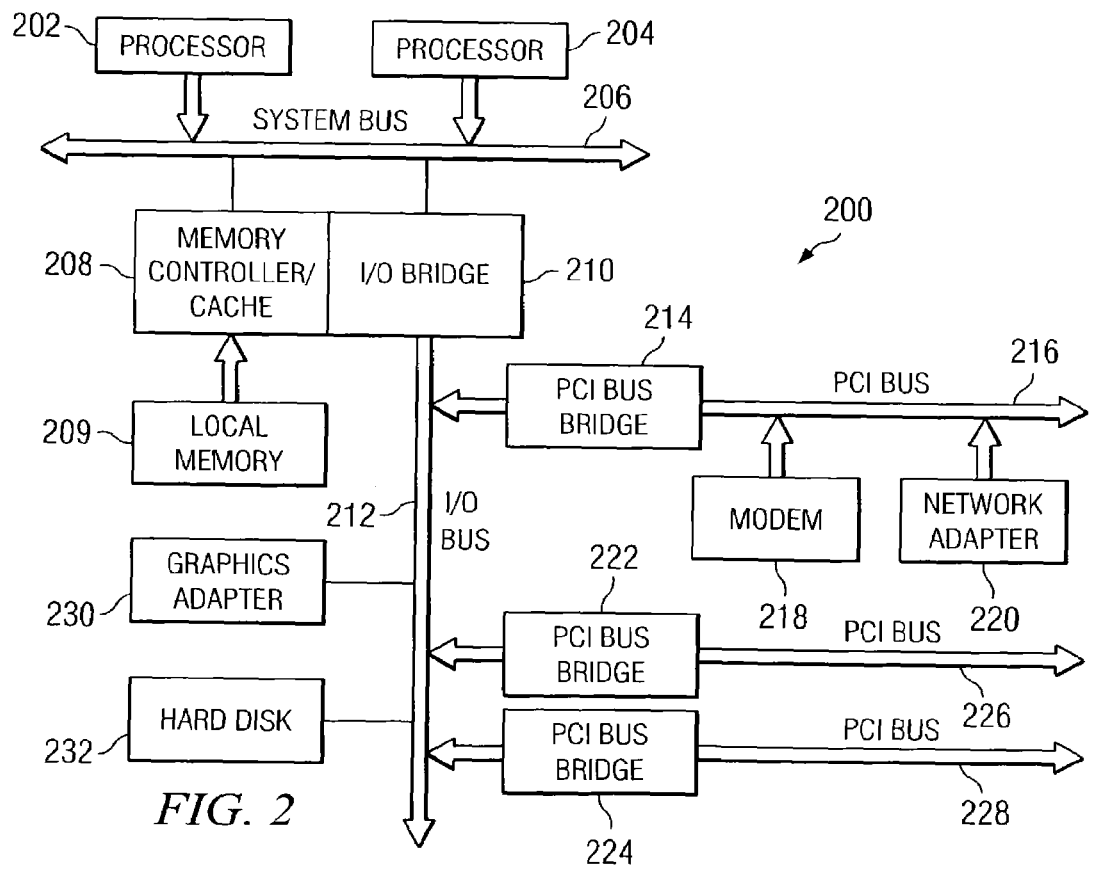
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
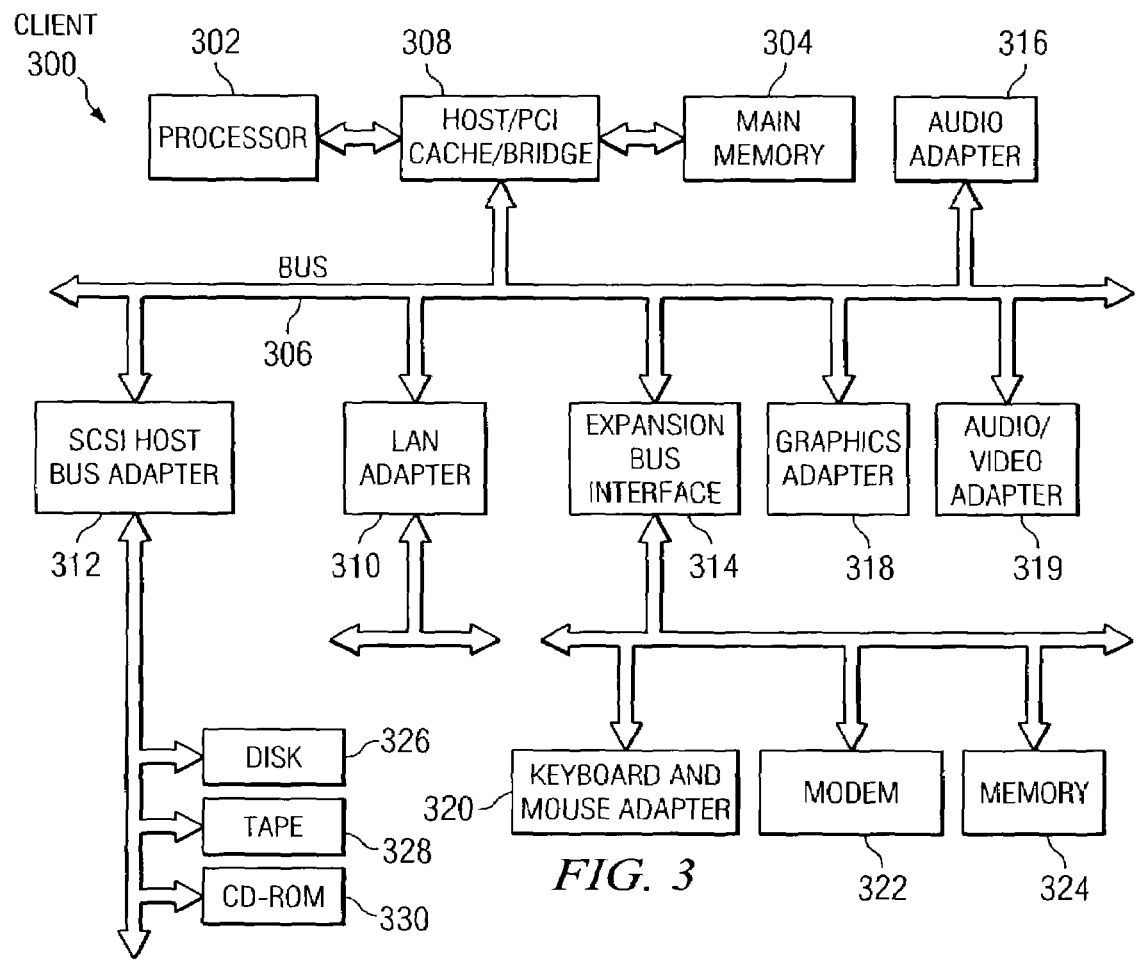
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards.

In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4A:
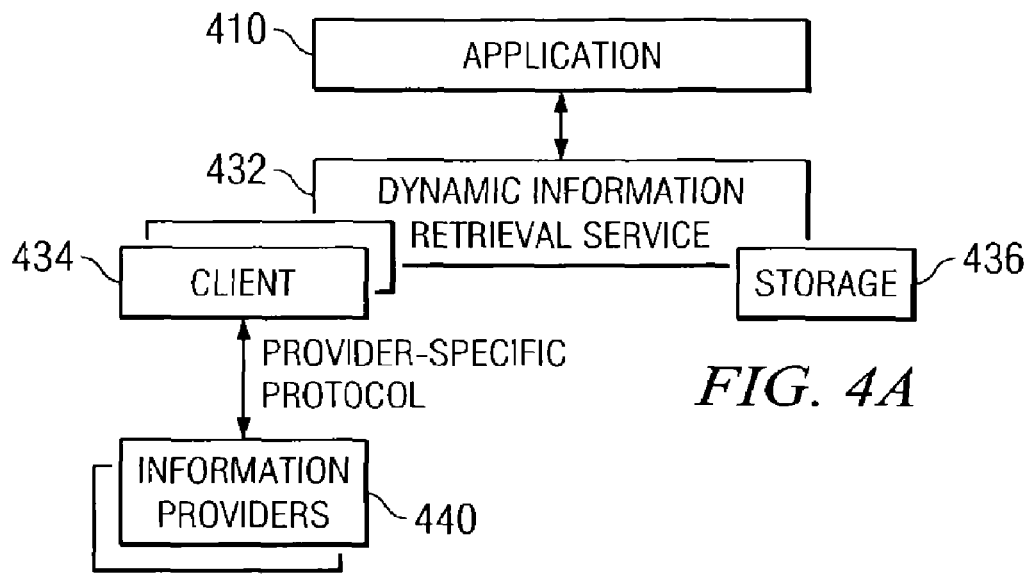
FIG. 4 is a block diagram illustrating a dynamic information retrieval service in accordance with a preferred embodiment of the present invention.
Figure 4B:
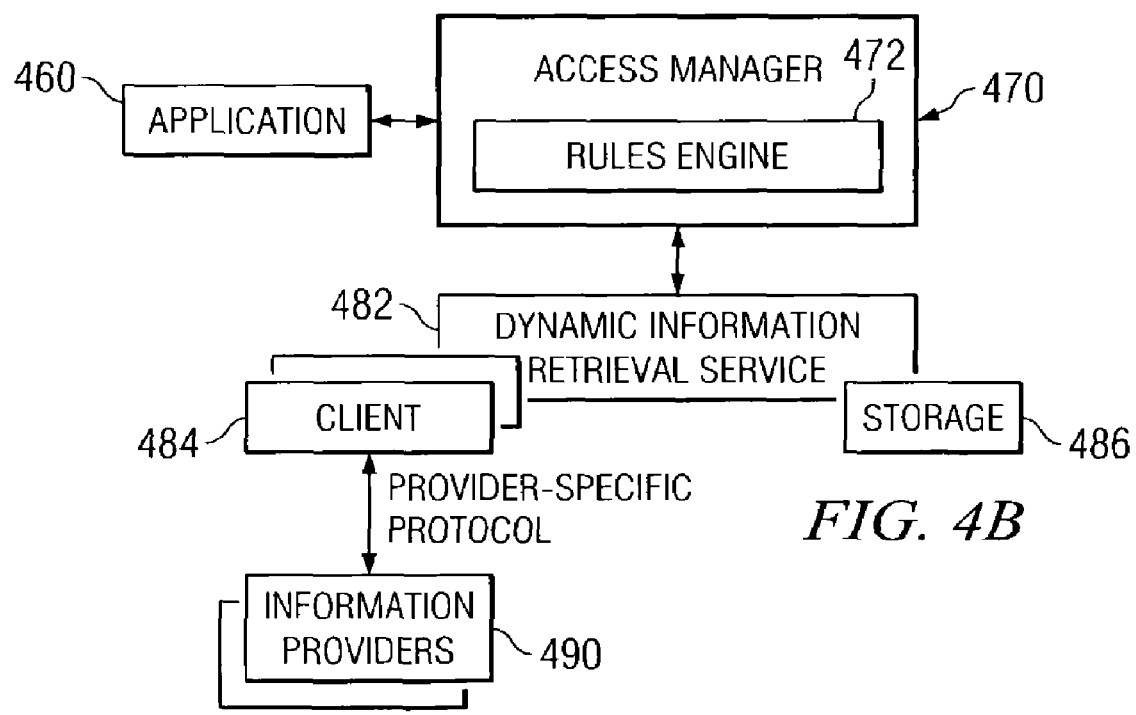

With reference now to FIGS. 4A and 4B, block diagrams are shown illustrating a dynamic information retrieval service in accordance with a preferred embodiment of the present invention. More particularly, FIG. 4A illustrates an application that makes decisions based on user specific entitlement data. As many examples of entitlement data, application 410 may be a software program used by a loan officer or automobile insurance agent. A mortgage loan officer may make decisions, using software tools, based on an applicant's credit worthiness, bank account balance, net worth, etc. Similarly, an automobile insurer may make decisions, using a software tool, based on an applicant's recorded traffic violations, previous claims, credit worthiness, etc. Therefore, application 410 may access many disparate information providers.

In accordance with a preferred embodiment of the present invention, the application sends requests to dynamic information retrieval service 432. This dynamic information retrieval service may be implemented as software in the same computer as application 410. In an alternative embodiment, dynamic information retrieval service 432 is implemented as a separate machine connected through a LAN or WAN, such as the Internet.

When dynamic information retrieval service 432 receives a request from application 410, a client 434 is generated for each information provider 440 for which entitlement data is to be retrieved. Each client 434 then retrieves the entitlement data using a provider-specific protocol and returns this information to dynamic information retrieval service 432. Once all the entitlement data for a request is retrieved, the dynamic information retrieval service compiles the retrieved containers into a standardized response to be returned to the requesting application.

The dynamic information retrieval service may store containers in storage 436. This storage may act as a cache for entitlement data with configurable cache policies. Thus, dynamic information retrieval service 432 may retrieve pieces of entitlement data from storage 436, rather than generating a client 434. Data retrieved from storage 436 will be in the form of containers and may be compiled into a standardized response as if the containers were retrieved from one or more of information providers 440.

With reference now to FIG. 4B, application 460 is an application that communicates with an access manager that makes informed user specific decisions for the application. Thus, application 460 communicates with access manager 470 and rules engine 472 for making these decisions. Access manager 470 manages access control and decides authorization queries for the application. Rules engine 472 is called by the access manager to evaluate Boolean rules based on credentials, entitlements, or application context data.

In accordance with a preferred embodiment of the present invention, the application sends requests to dynamic information retrieval service 482. This dynamic information retrieval service may be implemented as software in the same computer as application 460. In an alternative embodiment, dynamic information retrieval service 482 is implemented in a separate machine connected through a LAN or WAN, such as the Internet.

When dynamic information retrieval service 482 receives a request from access manager 470, a client 484 is generated for each information provider 490 for which entitlement data is to be retrieved. Each client 484 then retrieves the entitlement data using a provider-specific protocol and returns this information to dynamic information retrieval service 482. Once all the entitlement data for a request is retrieved, the dynamic information retrieval service compiles the retrieved containers into a standardized response to be returned to the requesting application.

The dynamic information retrieval service may store containers in storage 486. This storage may act as a cache for entitlement data with configurable cache policies. Thus, dynamic information retrieval service 482 may retrieve pieces of entitlement data from storage 486, rather than generating a client 484. Data retrieved from storage 486 will be in the form of containers and may be compiled into a standardized response as if the containers were retrieved from one or more of information providers 490.

Figure 5A:
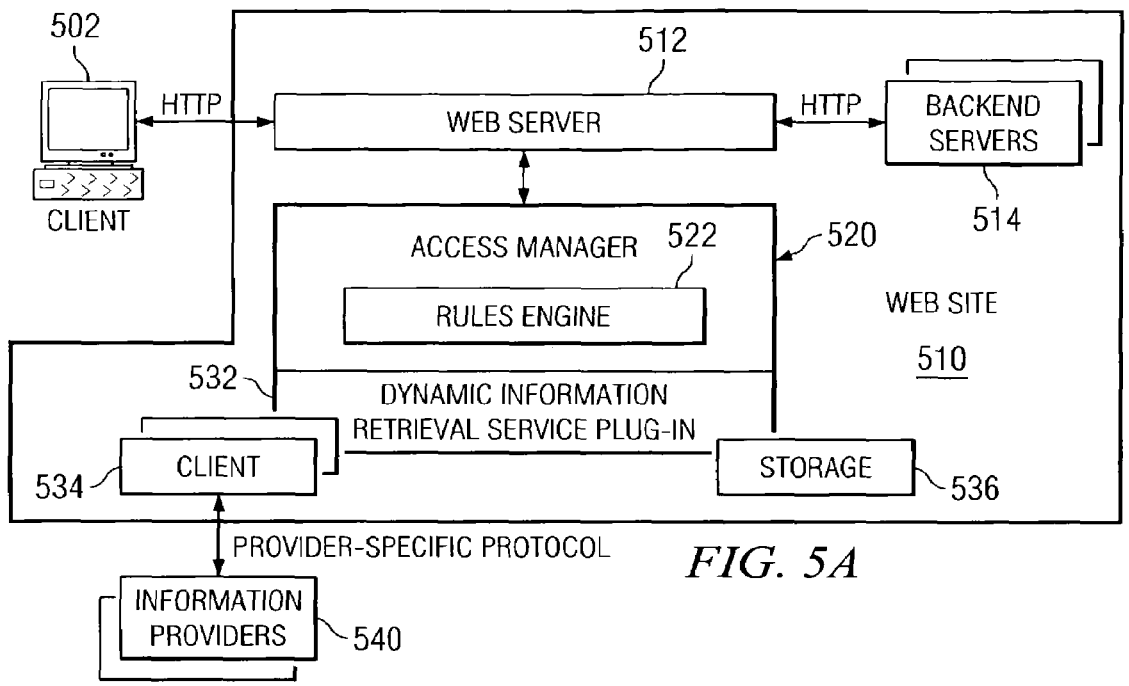
FIGS. 5A and 5B are block diagrams illustrating Web sites utilizing a dynamic information retrieval service in accordance with a preferred embodiment of the present invention.
Figure 5B:
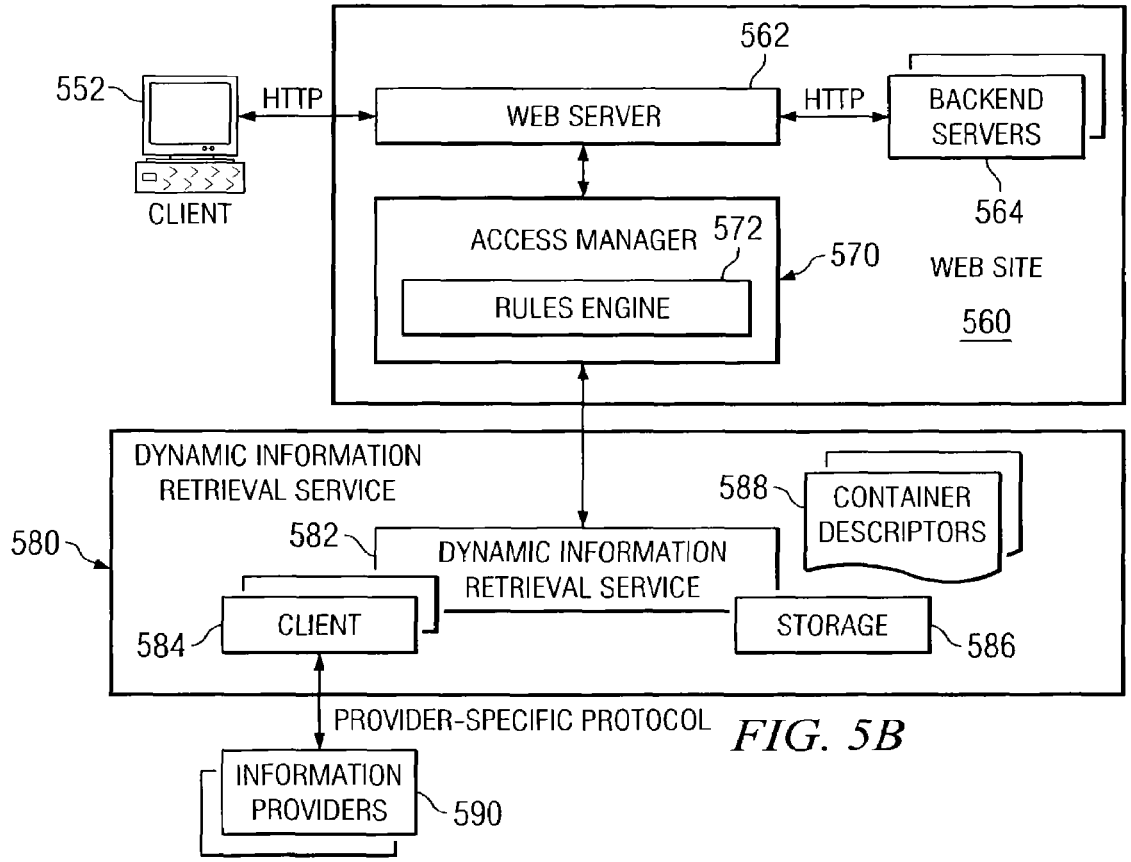

With reference now to FIGS. 5A and 5B, block diagrams illustrating Web sites utilizing a dynamic information retrieval service are shown in accordance with a preferred embodiment of the present invention. More particularly, with respect to FIG. 5A, a dynamic information retrieval service implemented as a software plug-in within Web site 510.

Web site 510 includes Web server 512, which receives hypertext transfer protocol (HTTP) requests from client 502. These requests may be for information and services provided by backend servers 514. Web site 510 may also provide services for client 502 for which access decisions are made. Thus, Web site 510 includes access manager 520 and rules engine 522 for making these decisions. Access manager 520 manages access control and decides authorization queries for the application. Rules engine 522 is called by the access manager to evaluate Boolean rules based on credentials, entitlements, or application context data.

The access manager may make decisions based on user specific entitlement data. For example, Web site 510 may be an e-commerce Web site that may extend credit based on an applicant's credit worthiness. In another example, Web site 510 may be an automobile insurance Web site that may make access decisions based on an applicant's recorded traffic violations, previous claims, credit worthiness, etc. Therefore, access manager 520 may access many disparate information providers.

In accordance with a preferred embodiment of the present invention, the access manager sends requests to dynamic information retrieval service plug-in 532. In the depicted example, this dynamic information retrieval service is implemented as a software plug-in within Web site 510.

When dynamic information retrieval service 532 receives a request from access manager 520, a client 534 is generated for each information provider 540 for which entitlement data is to be retrieved. Each client 534 then retrieves the entitlement data using a provider-specific protocol and returns this information to dynamic information retrieval service 532. Once all of the entitlement data containers for a request are retrieved, the dynamic information retrieval service compiles these containers into a standardized response to be returned to the requesting access manager.

The dynamic information retrieval service may store containers in storage 536. This storage may act as a cache for these containers with configurable cache policies. Thus, dynamic information retrieval service 532 may retrieve containers from storage 536, rather than generating a client 534. Containers retrieved from storage 536 may be compiled into a standardized response as if the containers were retrieved from one or more of information providers 540.

In the embodiment illustrated in FIG. 5B, the dynamic information retrieval service is implemented as a separate machine. Web site 560 includes Web server 562, which receives hypertext transfer protocol (HTTP) requests from client 552. These requests may be for information and services provided by backend servers 564. Web site 560 may also provide services for client 552 for which access decisions are made. Thus, Web site 560 includes access manager 570 and rules engine 572 for making these decisions. Access manager 570 manages access control and decides authorization queries for the application. Rules engine 572 is called by the access manager to evaluate Boolean rules based on credentials, entitlements, or application context data.

In accordance with a preferred embodiment of the present invention, the access manager sends requests to dynamic information retrieval service 580, which may be implemented in a separate machine, such as server 104 in FIG. 1, connected through a LAN or WAN, such as the Internet. As an example, the access manager may send an access decision information request as a simple object access protocol (SOAP) request.

The dynamic information retrieval service includes dynamic information retrieval server 582, which receives requests from access manager 570. The dynamic information retrieval service generates a client 584 for each information provider 590 for which entitlement data is to be retrieved. Each client 584 then retrieves the entitlement data in the form of containers using a provider-specific protocol and returns this information to dynamic information retrieval service 582. The dynamic information retrieval service compiles the containers into a standardized response to be returned to the requesting access manager.

The dynamic information retrieval service may store containers in storage 586. This storage may act as a cache for entitlement data containers with configurable cache policies.

Requests to the dynamic information retrieval service must take a certain form. Preferably, a request includes information describing the identity of the user and a list of names representing the entitlement data that are required, wherein the user is the user to which entitlement information pertains. The dynamic information retrieval service determines the appropriate provider for the entitlement information based on the entitlement data names in the request.

Furthermore, the containers in which the requested entitlement information is returned will take a specific form. Thus, dynamic information retrieval service 580 may also include container descriptors 588. These descriptors may be used by Web site developers to code access manager 570 and rules engine 572. Developers may use this information to learn how data is to be extracted from the standardized response. For example, if a request for a user's available balance with a credit card company is sent, the access manager and rules engine must extract this piece of data from the credit card company's container, which may contain more information than simply the available balance.

The container descriptors may contain the following:
  A unique identification (ID) that uniquely identifies the container.
  The extensible markup language (XML) name of the container. This will later be used as the XML element name that will contain all of the container's data. A container named "customerData" will later produce an element "<customerData>."
  A cost for retrieving the container.
  A list of attribute definitions. Each attribute definition contains an attribute name and an XML simple type.
  References to the unique ID of sub containers. In a preferred embodiment, if a container is retrieved, its sub containers are automatically retrieved as well.
  Property elements. These can be used to store implementation specific information, such as the providers that are able to provide this kind of container. Providers may be specified by name and protocol.

With reference now to FIG. 6, a data flow diagram for a dynamic information retrieval service is shown in accordance with a preferred embodiment of the present invention. Access manager 602 sends an access decision information request to dynamic information retrieval server 612 (action 1). In a preferred embodiment, the request identifies a user and a list of names representing the entitlement data that are required. The dynamic information retrieval server starts a session 614 for the user (action 2).

In the depicted example, the dynamic information retrieval server determines that the entitlement data can be retrieved from two access decision information providers 632, 634. The session generates clients 622, 624 for the information providers (action 3) and each client retrieves entitlement data, in the form of containers, from one of information providers 632, 634 using a provider-specific protocol (action 4).

Thereafter, each client returns the entitlement information containers to the session (action 5) and the session shuts down the clients. The session then returns the entitlement data containers to dynamic information retrieval server 612 (action 6). Then, the dynamic information retrieval server shuts down the session, builds a response, and returns standardized response 640 to the requesting access manager 602 (action 7).

FIG. 7 illustrates an example container data structure in accordance with a preferred embodiment of the present invention. In the depicted example, the container data structure is an extensible markup language (XML) document with recursively defined sub containers. This example is a tagged document with a hierarchical structure.

Figure 8A:
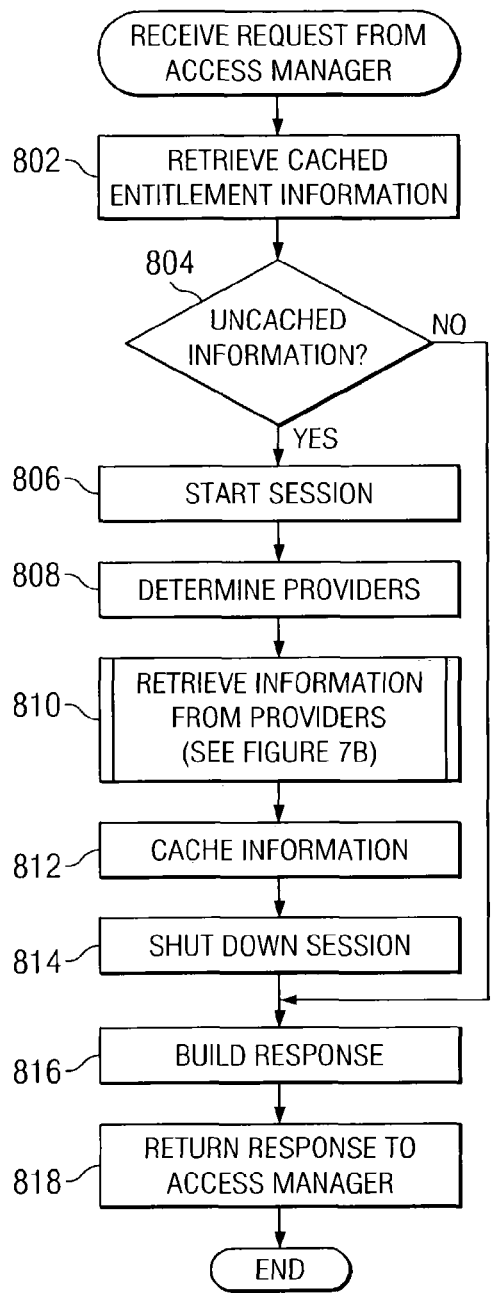
FIGS. 8A and 8B are flowcharts illustrating the operation of a dynamic information retrieval service in accordance with a preferred embodiment of the present invention.
Figure 8B:
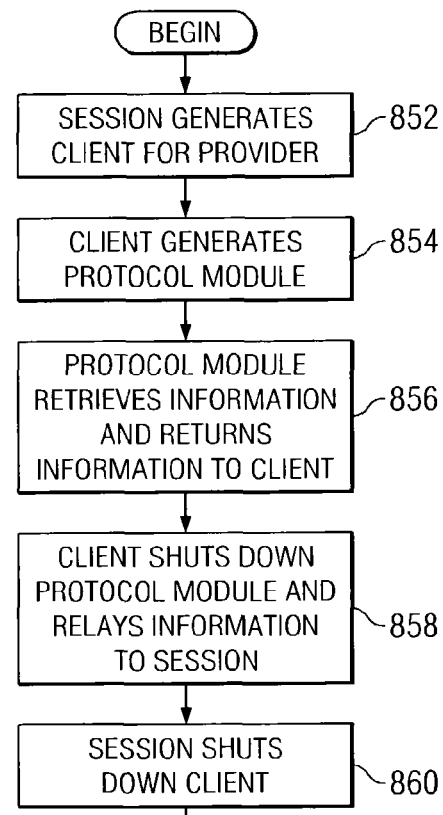

With reference to FIGS. 8A and 8B, flowcharts illustrating the operation of a dynamic information retrieval service are shown in accordance with a preferred embodiment of the present invention. More particularly, with respect to FIG. 8A, the process begins by receiving a request for access decision information from an access manager. The process retrieves any cached entitlement information from storage (step 802).

Next, a determination is made as to whether any uncached entitlement information is requested (step 804). If uncached entitlement information is requested, the process starts a session (step 806) and determines from which information providers the entitlement information is to be retrieved (step 808). The process retrieves entitlement information from the information providers (step 810). The operation of retrieving entitlement information from the information providers will be described with more detail below with respect to FIG. 8B.

Thereafter, the session caches the entitlement information (step 812) and the process shuts down the session (step 814). Then, the process builds a response (step 816), returns the response to the requesting access manager (step 818), and ends. Returning to step 804, if all of the requested entitlement information was cached, the process continues directly to step 816 to build a response. Thereafter, the process returns the response to the access manager (step 818) and ends.

Turning now to FIG. 8B, a flowchart illustrating the operation of retrieving access decision information from an information provider is shown. The process begins and the session generates a client for the information provider (step 852). The client then generates a protocol module (step 854). The protocol module retrieves access decision information and returns the information to the client (step 856). Then, the client shuts down the protocol module and relays the information to the session (step 858). Thereafter, the session shuts down the client (step 860) and the process ends.

Thus, the present invention solves the disadvantages of the prior art by providing a dynamic information retrieval service that can be configured to retrieve entitlement information from a plurality of providers. Any application that requires entitlement data may make a request for that information to the dynamic information retrieval service using a single standard interface. The dynamic information retrieval service determines the appropriate provider for the entitlement information, retrieves the entitlement data, and returns the requested entitlement data to the application. The dynamic information retrieval service may also cache the entitlement data. The dynamic information retrieval service may process requests requiring several distinct items of entitlement data to be retrieved in parallel. Therefore, applications may send a single request for entitlement data for a single user, but for several providers.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for dynamic access decision information retrieval, the method comprising:

receiving a request for access decision information from an application, wherein the request identifies a plurality of entitlement information items for an entity and an identity of the entity, responsive to receiving the request starting a session for the entity in a dynamic information retrieval server data processing system;

determining, at the dynamic information retrieval server data processing system, a given entitlement information provider for each one of the plurality of entitlement information items to form a plurality of entitlement information providers, wherein the plurality of entitlement information providers are determined based on the plurality of entitlement information items identified in the request that is received;

retrieving, at the dynamic information retrieval server data processing system, a given entitlement information item from each one of the plurality of entitlement information providers, wherein retrieving the given entitlement information item from each one of the plurality of entitlement information providers includes generating a retrieval client for each one of the plurality of entitlement information providers to form a plurality of retrieval clients, wherein each one of the retrieval clients is generated by the session and retrieves entitlement information from a given one of the plurality of entitlement information providers that each one of the retrieval clients is associated with, wherein the retrieved entitlement information is returned to the session;

forming a response, wherein the response includes the one or more entitlement information items; and returning the response to the application, wherein the application is an access manager that is operatively coupled to a web server that receives entity requests from the entity in order to make informed entity-specific entitlement decisions regarding a service requested by the entity, wherein each one of the retrieval clients generates a protocol module to form a plurality of protocol modules, and wherein each one of the protocol modules retrieves entitlement information from a given one of the entitlement information providers that each one of the protocol modules is associated with using a provider specific protocol that is compatible with the given one of the entitlement information providers.

2. The method of claim 1, wherein the entity is a user that contacts the web server to obtain the service therefrom.

3. A dynamic access decision information apparatus for providing dynamic access decision information retrieval, the apparatus comprising:

receipt means for receiving a request for access decision information from an application, wherein the request identifies a plurality of entitlement information items for an entity and an identity of the entity, responsive to receiving the request, starting a session for the entity in a dynamic information retrieval server data processing system;

determination means for determining, at the dynamic information retrieval server data processing system, a given entitlement information provider for each one of the plurality of entitlement information items to form a plurality of entitlement information providers, wherein the plurality of entitlement information providers are determined based on the plurality of entitlement information items identified in the request that is received;

retrieval means for retrieving, at the dynamic information retrieval server data processing system, a given entitlement information item from each one of the plurality of entitlement information providers, wherein retrieving the given entitlement information item from each one of the plurality of entitlement information providers includes generating a retrieval client executable process within the dynamic access decision information apparatus for each one of the plurality of entitlement information providers to form a plurality of retrieval clients, wherein each one of the retrieval clients is generated by the session and retrieves entitlement information from a given one of the plurality of entitlement information providers that each one of the retrieval clients is associated with, wherein the retrieved entitlement information is returned to the session;

forming means for forming a response, wherein the response includes the one or more entitlement information items; and returning means for returning the response to the application, wherein the application is an access manager that is operatively coupled to a web server that receives entity requests from the entity across a network, wherein the access manager includes a rules engine that is called by the access manager to evaluate rules based on credentials and entitlements of the entity in order to make informed entity-specific decisions regarding a service requested by the entity, wherein each one of the retrieval clients generates a protocol module to form a plurality of protocol modules, and wherein each one of the protocol modules retrieves entitlement information from a given one of the entitlement information providers that each one of the protocol modules is associated with using a provider specific protocol that is compatible with the given one of the entitlement information providers.

4. A computer recordable medium having a computer program product tangibly embodied therein, wherein the computer program product is operable in a data processing system for providing dynamic access decision information retrieval, the computer program product comprising:

instructions for receiving a request for access decision information from an application, wherein the request identifies a plurality of entitlement information items for an entity and an identity of the entity, responsive to receiving the request starting a session for the entity in a dynamic information retrieval server data processing system;

instructions for determining, at the dynamic information retrieval server data processing system, a given entitlement information provider for each one of the plurality of entitlement information items to form a plurality of entitlement information providers, wherein the plurality of entitlement information providers are determined based on the plurality of entitlement information items identified in the request that is received;

instructions for retrieving, at the dynamic information retrieval server data processing system, a given entitlement information item from each one of the plurality of entitlement information providers, wherein the instructions for retrieving the given entitlement information item from each one of the plurality of entitlement information providers includes instructions for generating a retrieval client executable process within the data processing for each one of the plurality of entitlement information providers to form a plurality of retrieval clients, wherein each one of the retrieval clients is generated by the session and retrieves entitlement information from a given one of the plurality of entitlement information providers that each one of the retrieval clients is associated with, wherein the retrieved entitlement information is returned to the session;

instructions for forming a response, wherein the response includes the one or more entitlement information items; and instructions for returning the response to the application, wherein the application is an access manager that is operatively coupled to a web server that receives entity requests from the entity across a network, wherein the access manager includes a rules engine that is called by the access manager to evaluate rules based on credentials and entitlements of the entity in order to make informed entity-specific decisions regarding a service requested by the entity, wherein each one of the retrieval clients generates a protocol module to form a plurality of protocol modules, and wherein each one of the protocol modules retrieves entitlement information from a given one of the entitlement information providers that each one of the protocol modules is associated with using a provider specific protocol that is compatible with the given one of the entitlement information providers.

* * * * *